June 18, 1935.                S. E. TALBOT                2,005,058
                HEAD LAMPS INCORPORATING GLARE PREVENTING DEVICES
                       Filed Nov. 22, 1933       2 Sheets-Sheet 1

INVENTOR.
STANLEY EDWARD TALBOT
BY
Benj. T. King
ATTORNEY.

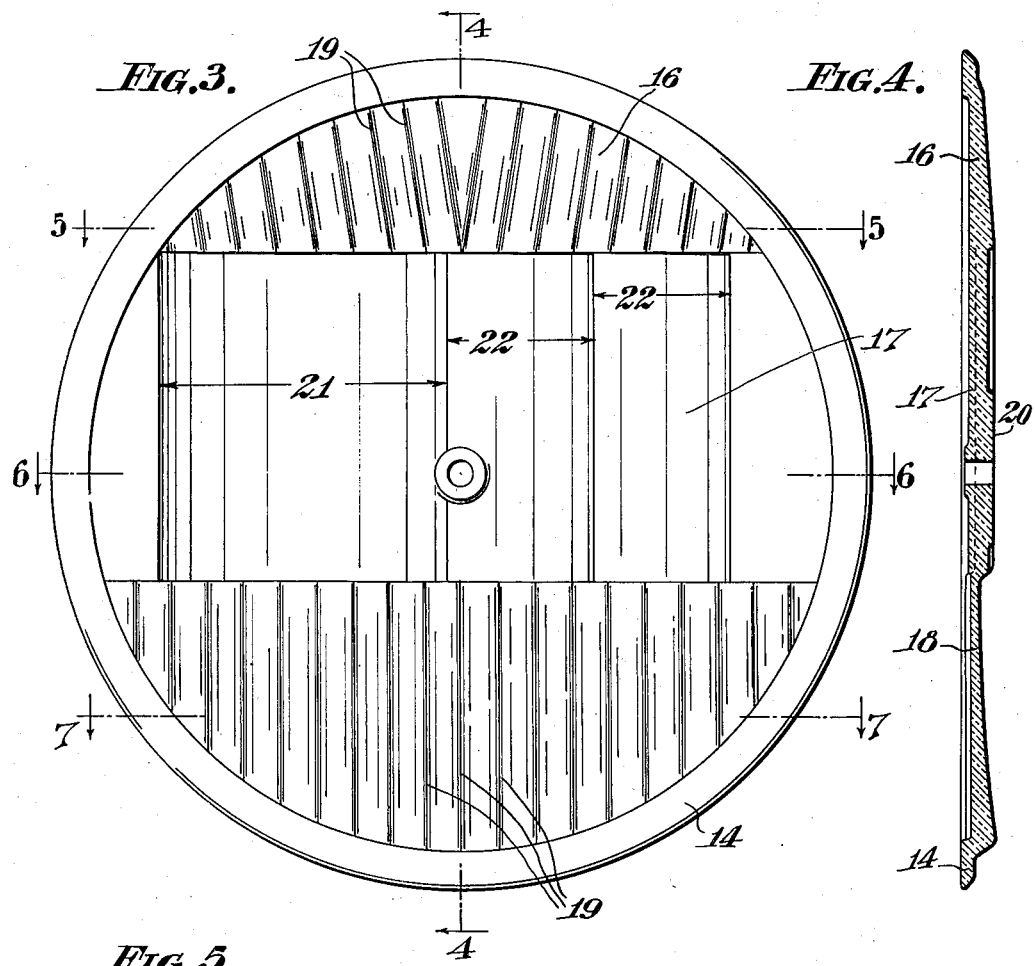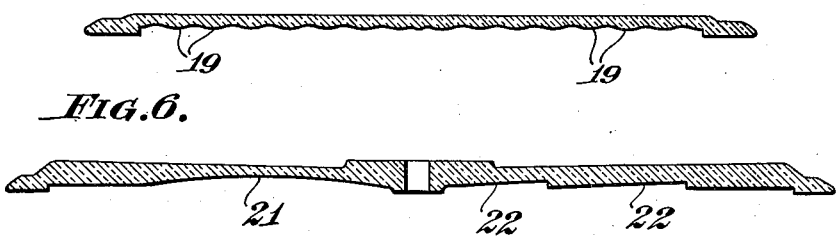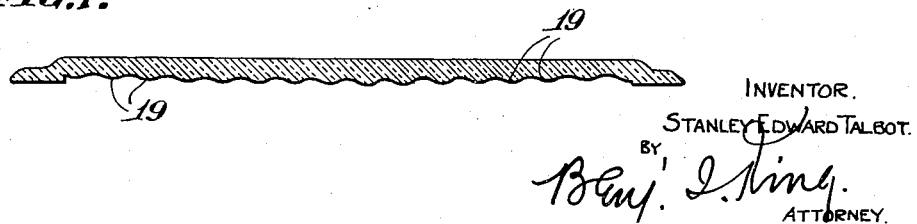

Patented June 18, 1935

2,005,058

UNITED STATES PATENT OFFICE 2,005,058

HEAD LAMPS INCORPORATING GLARE-PREVENTING DEVICES

Stanley Edward Talbot, London, England

Application November 22, 1933, Serial No. 699,157
In Great Britain November 26, 1932

3 Claims. (Cl. 240—48.4)

This invention relates to anti-glare devices for vehicle headlamps and has for its object to provide an apparatus which will refract and propagate the light rays to the best advantage so as to minimize or eliminate glare and yet make full use of the light to ensure efficient illumination of the road necessary for safe driving. In achieving this object the invention provides a front glass formed with prisms to refract portions of the light beam in various directions as will be hereinafter explained, and to ensure of accurate refraction there is provided in combination with the front glass a beam-constricting device which divides up the beam into a number of sections, and is designed to control the maximum angle of divergence of the rays constituting that section. This results in the production of a narrow pencil beam.

Having produced a beam of this form it is possible to design the front glass to refract said beam in desired manner and produce an accurate result such as could not be achieved if extraneous rays subtending a greater angle with respect to the axis of the lamp (which are invariably produced by reflection no matter what type of reflector is used) were allowed to play on to the front glass. Such extraneous rays would be refracted in various directions and would defeat the object of the invention.

With the foregoing objects in view the anti-glare device provided in accordance with my invention comprises a beam-constricting unit for dividing the beam into a number of sections and restricting the angle of divergence of each section, and a front glass constructed with a central area to permit propagation of light horizontally through said area, and upper and lower prismatic areas constructed to refract downwardly the constricted beam sections which impinge on said areas.

For a clear understanding of the invention reference is directed to the accompanying drawings illustrating a preferred embodiment of the invention and wherein:—

Figure 3 is a rear view of the front glass.

Figure 4 is a vertical cross section on line 4—4 in Figure 3, and

Figure 1:
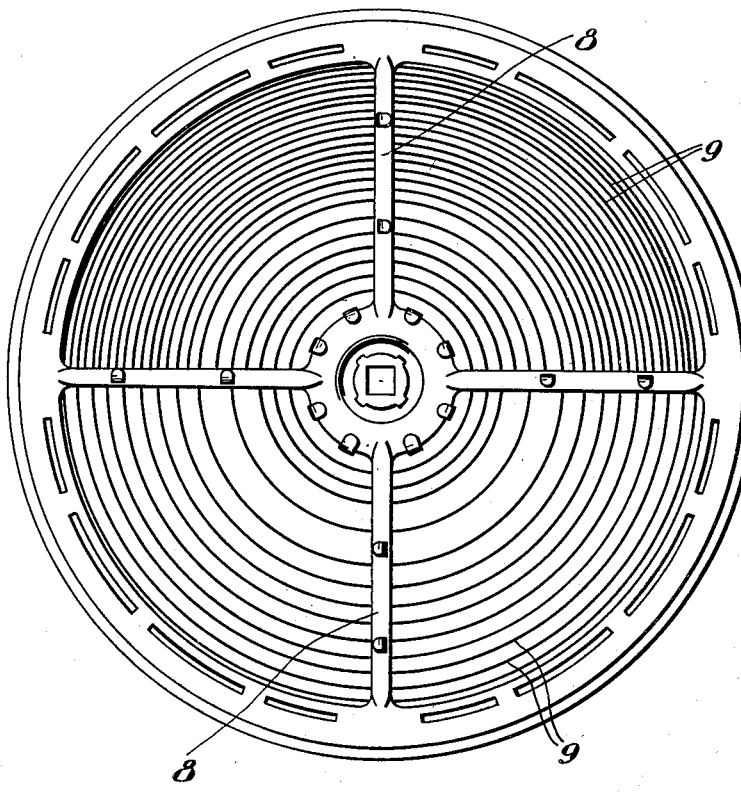
Figure 1 is a front view of the beam-constricting device.
Figure 2:
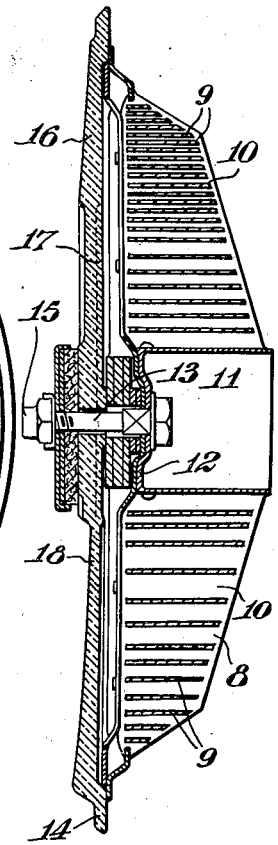
Figure 2 is a cross-sectional view through the complete anti-glare device.

Figs. 5, 6 and 7 are horizontal sections on lines 5—5, 6—6 and 7—7 respectively in Figure 3.

Referring to the drawings the device incorporates a beam-constricting device 8 which consists of a plurality of rings 9 which are of varying depths and are concentrically nested and mounted in the vanes 10 of a spider in such a manner as to form a conical unit. The space between adjacent rings varies in proportion to the depths of the adjacent rings so that the different sections of the beam passing through the different spaces all have the same angle of greatest divergence, this angle being very small with respect to the axis of the lamp. As shown, alternate rings are discontinued in the lower half of the unit, producing a different constant angle of greatest divergence, but the same principle still applies.

The front edges of the rings are flush throughout the complete nest of rings, and the innermost ring 11 is formed with a closed front end 12 which is centrally apertured for the passage of a bolt 13.

In combination with the beam constricting device constructed as above described there is provided a front glass 14 which constitutes a second component part of the device. The said glass is attached to the said unit and correctly located in relation thereto by the formation in said glass, at the axis of a hole adapted to be passed over the bolt 13, a nut 15 being subsequently screwed on to the bolt to effect the attachment.

The glass 14 is divided into a top area 16 central or medial area 17 and bottom area 18. Both the top area 16 and bottom area 18 are formed with ribs 19 on the rear surface of the glass, the ribs of the top area being shallow whilst those of the bottom area are deeper. The ribs 19 of the top area incline, in the downward direction towards the centre of the glass whilst the ribs of the bottom area are vertical. This ribbed formation produces a spreading of the rays which pass through the said areas. The front face 20 of the glass inclines forwardly in a downward direction throughout the top area whilst the front face of the central area 17, is vertical i. e. parallel to the back of the glass. At the bottom of the central area 17 and front face is stepped back and from said step the front face continuing downwardly, is curved in the forward direction throughout the bottom area 18 to produce a prism having a concave front face.

The horizontal wedge-like prisms thus formed to constitute the top and bottom areas, produce a downward refraction of the light rays which pass through them, the rays which pass through the bottom area being spread through a wide angle downwardly from the upper horizontal limit due to the concave form of the front of said area, to afford a satisfactory illumination immediately in front of the vehicle. The light passing through the upper and lower areas is also splayed to left and right due to the ribbed formation of the rear faces of those areas.

The rear surface of the central or medial area 17 is made concave in the horizontal direction throughout the portion 21 situated at one side of the vertical center of the glass or lens to effect a slight spreading of the rays which pass through that portion, whilst on the other side of the centre vertical wedge-like prisms 22 are formed which will have the effect of refracting the beams which pass through such area towards or across the axis of the lamp so that they become superimposed on the beam projected through the portion 21 and are thus directed away from the line of vision of an approaching vehicle, towards the near side of the road, thus assisting the illumination of the said near side.

From the foregoing description it will be seen that the rays are refracted in an accurate manner due to the control exercised by the beam constricting device and thus, by their combination, the beam constricting device and light-refracting glass serve to illuminate the road to the best advantage and ensure adequate illumination with absence of glare.

I claim:—

1. An anti-glare device for vehicle headlamps comprising in combination a beam-constricting device composed of a plurality of concentrically disposed circular rings for dividing the beam into a number of sections and a front glass positioned in front of and adjacent the said constricting device, said glass being formed with a horizontally disposed medial area which is formed at one side of the vertical center of the glass with a horizontally concave depression to effect spreading of the rays and on the other side of the said center with vertically disposed prisms of wedge-section having their thicker portions innermost to project the beam sections towards the axis of the lamp, and with top and bottom areas which are ribbed and forwardly inclined in the downward direction to effect downward deflection and lateral spreading of the rays which pass through said upper and lower areas.

2. An anti-glare device according to claim 1 wherein the inclination of the ribbed bottom area of the glass is produced by a concave curve to effect propagation of light through a wide angle in the downward direction.

3. An anti-glare device for vehicle headlamps comprising a beam-constricting device composed of a conical assembly of concentric rings and a front glass clamped to said beam-constricting device, said glass being formed with a horizontal medial area whose rear surface at one side of the vertical center of the glass is formed with a concave depression to effect spreading of the rays and on the other side of said center is provided with vertically disposed prisms of wedge-section having their thicker portions innermost to project the beam sections towards the axis of the lamp, said glass being also formed with top and bottom areas which have their rear faces ribbed and their front faces downwardly and forwardly inclined with respect to a vertical plane so as to effect downward deflection and lateral spreading of the rays which pass through said upper and lower areas, the downwardly and forwardly inclined front face of the bottom area being produced on a concave curve to effect propagation of light through a wide angle in the downward direction.

STANLEY EDWARD TALBOT.